Dec. 26, 1967 H. STÖCKLÖCKER 3,359,989
APPARATUS FOR MOISTENING TOBACCO BALES BY MEANS OF A CURRENT
OF MOIST AIR OR OF VAPOR IN A VACUUM
Filed May 19, 1966 2 Sheets-Sheet 1

INVENTOR.
Heinrich Stöcklöcker
BY
Attorney

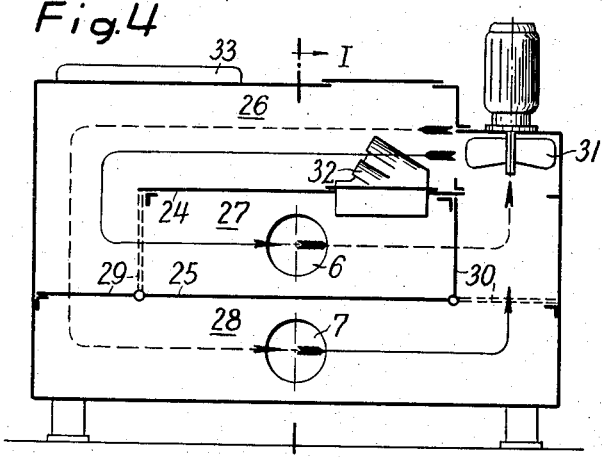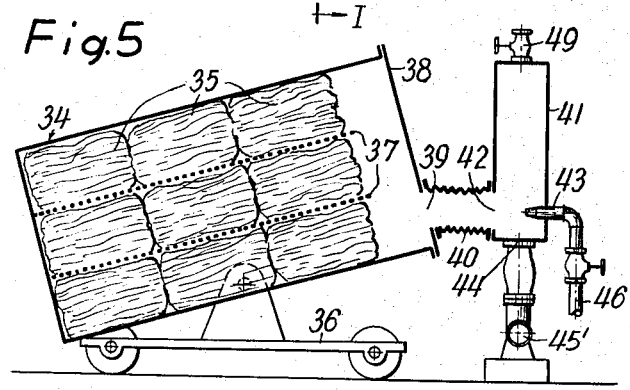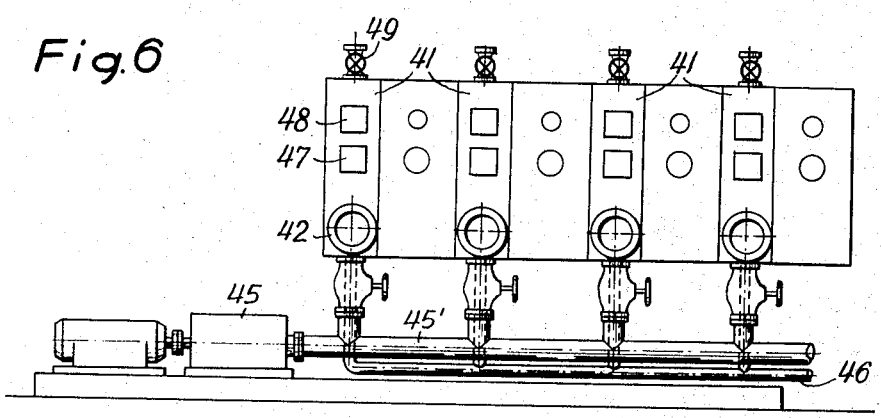

United States Patent Office 3,359,989
Patented Dec. 26, 1967

3,359,989
APPARATUS FOR MOISTENING TOBACCO BALES BY MEANS OF A CURRENT OF MOIST AIR OR OF VAPOR IN A VACUUM
Heinrich Stöcklöcker, Vienna, Austria, assignor to Schiff & Stern Gesellschaft m.b.H., Vienna, Austria
Filed May 19, 1966, Ser. No. 551,289
Claims priority, application Austria, May 20, 1965, A 4,606/65
12 Claims. (Cl. 131—136)

The present invention relates to an apparatus for moistening bales of tobacco by means of a current of moist air or of vapor in a vacuum, whereby the bales put on vehicles are shut off tightly from the outside and passed through by the moist air or vapor.

A moistening apparatus of this kind is already known, which is operated by moist air and consists of three units, one of them being a movable feeder chamber, in which water is atomized to vapor for providing and feeding the moist air, secondly a stationary chamber which has a suction blower to exhaust the moist air, and thirdly a vehicle on which the tobacco bale is put and surrounded by a tubular cover in order to shut off the cylindrical surface of the bale from the outside air. The vehicle with the tobacco bale is driven in between the stationary exhaust chamber and the movable feeder chamber, drawn up to the stationary chamber, and the movable chambers are pulled up to the vehicle; then the two open ends of the tubular cover are fastened onto the ends of the two chambers, and finally the blower is set to work. The main disadvantages of this apparatus already known are that it is rather troublesome to shift the two movable units and to join the tubular cover to the chambers; that only one bale at a time can be handled with this apparatus and that furthermore, this apparatus is entirely unsuited for short bales, since the bales have to be put into the current of moist air in a lengthwise position so that the outer atmospheric pressure presses the tubular cover against the bale for a sufficient length, avoiding thus an inefficient flow of moist air in the space between the bale and the cover. However, with long bales moistening does not only take a comparatively long time but also can it be effected only in a non-uniform manner, since that end of the bale which is close to the feeder becomes excessively moist, i.e. wet, and thus may show conspicuous water spots by the time the desired amount of humidity is reached at the other end of the bale which is close to the exhaust. However, changing the position of the bale, in order to improve and shorten the moistening process, is again rather troublesome, since the links between the chambers have to be unfastened, the vehicle loaded with the bale has to be turned by 180 degrees, and the tubular cover has to be re-fastened onto the two other units.

This invention has for an object to avoid the disadvantages mentioned above, and consists in that the apparatus consists of a stationary tapping unit for feeding and exhausting said moist air or supplying said vapor, and a movable processing unit constructed as a tight case housing the tobacco bales and adapted to be connected to said tapping unit for moistening said tobacco bales by said moist air or vapor. According to the invention the apparatus thus consists only of two units, which simplifies the procedure, and the process of moistening the bales may therefore be carried out much more economically than with the equipment already known in the art. It is only necessary to draw the movable processing unit near to the stationary tapping unit and thus it is possible to join the source of moist air and the processing unit in a simple and time-saving manner. The construction of the processing unit as a case simplifies the charging procedure and permits the accommodation of several bales. Treatment may be carried out by means of a current of moist air or with the help of vapor applied in a vacuum, whereby uniform moistening of the tobacco bales is achieved. Another advantage is that the movable processing unit may serve as a transportation vehicle for the tobacco bales. In the warehouse the tobacco bales may be put on the vehicle, which is then shifted to the tapping unit for moistening, and then moved on to the succeeding stages of manufacturing. The moist bales may remain in the closed processing unit for longer periods of time without suffering any considerable loss of humidity.

According to a further feature of the invention the case, which is linked with the tapping unit so that moist air may be fed and exhausted, is divided into two sections either by means of a sloping partition-wall which has a grating to hold the tobacco bales, or by means of two partition-walls and gratings which lean towards each other, whereby each section is provided with a pipe connection for the tapping unit.

According to the invention the tapping unit preferably used in connection with the invention is divided into three parallel channels through which the air circulates. One of the two outer channels is provided with a ventilator and an air-moistening appliance, whereas the other outer channel and the central channel each have an outlet; the central channel may be connected with that channel in which the ventilator is located by means of traps on either end of the channel. On account of these traps the two outlets may alternately serve as feeding or exhaust pipes for the moist air, thus reversing the direction of the current of air. Therefore, it is possible to permeate the tobacco bales with the current of moist air in two opposite directions without breaking the connection between the tapping unit and the processing unit, which is in turn a simple method to shorten the period required for moistening, and which effects a more important result, namely that the leaves in the bales are moistened more evenly.

According to the invention a modified construction of the tapping unit may be provided with several connections instead of one in each of the two channels, i.e. the central channel and one outer channel, so that a number of processing units may be connected with the tapping unit. According to a further feature of the invention several tapping units, each with a couple of outlets, may be joined to a connecting line, to effect better results with those types of tobacco which are not so readily moistened. The processing unit is connected with one of the tapping units, which are thus set up parallel to each other, the outlets of the other tapping units being sealed off. With such an arrangement the ventilators and air moistening appliances of the various tapping units work together for one processing unit so that the circulation of moist air, as well as moistening are greater, as if the processing unit were joined to only one tapping unit. One standardized tapping unit may thus achieve various performances, which means simplifications for the processing industry.

According to the invention the tobacco-leaves may also be moistened by means of vapor in the vacuum, as has been mentioned above. According to the invention the case of the processing unit is then provided with outlets for the vacuum and for the vapor, and the tapping unit has one or several sockets, located side by side, which serve to join the vacuum-pump and the vapor-feeder to the outlets of the case. Furthermore, the tapping unit comprises a vacuum meter, a hygrometer, and a valve for pressure compensation.

In the drawings embodiments of the invention are shown by way of example.

FIGURE 4 shows a sectional view of the tapping unit along line IV—IV of FIGURE 1.

FIGURE 5 is a sectional view of a modified tapping unit which is connected with a processing unit and adapted for evacuating the processing unit and supplying vapor.

FIGURE 6 shows several tapping units as illustrated in FIGURE 5, joined to form a set.

Figure 1:
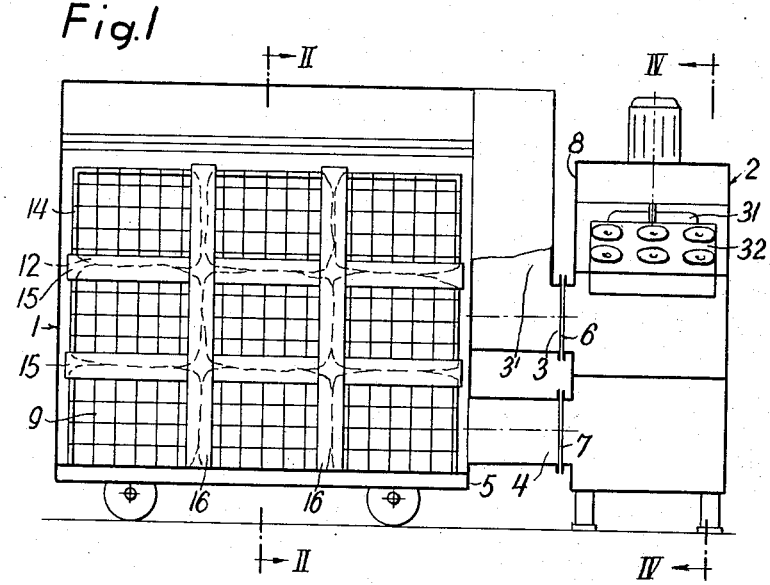
FIGURE 1 shows in a sectional view along line I—I of FIG. 2 and line I—I of FIG. 4 a processing unit connected with a tapping unit which is constructed as an air-change-over chamber.

According to FIGURE 1 a movable processing unit 1, constructed as vehicular container or moisture tight case, is connected with a tapping or supply unit 2, which feeds moist air, whereby the outlets 3, 4 on the wall 5 of the processing unit 1, and the outlets 6, 7 on the wall 8 of the tapping unit 2 are located to face each other once the processing unit is drawn up to the tapping unit, and therefore may be quickly joined by means of e.g. a snap plug, without using connecting pipes.

Figures 2, 3:
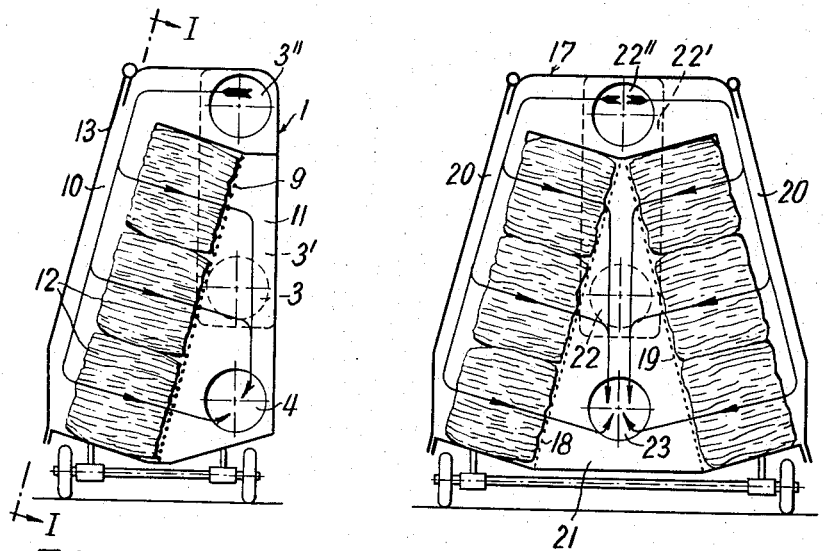
FIGURE 2 shows a sectional view along line II—II of FIGURE 1 of the processing unit.
FIGURE 3 is a similar sectional view of a modified example of the processing unit.

According to FIGURES 1 and 2 the case of the processing unit is divided into two sections 10, 11 by means of a partition-wall with grating 9. Through a trapdoor 13 or a roller-blind, which seals off the case tightly, the tobacco bales 12 are admitted into section 10 and piled up against the sloping grating 9 in several—in the present example in three—rows. When charging the unit section 10 it has to be checked that the bales cover the grating to the greatest possible extent. Since the edge of the bales are of irregular shape, the spaces which occur in between the bales will also have to be covered so that the current of air, which conveys the humidity, is utilized most economically. For this purpose the grating is surrounded by a frame 14, whose cross-beams are provided with movable bands 15, 16 to be shoved in between the tobacco bales 12, which in FIGURE 1 are indicated by dotted lines. Outlet 3 goes into section 10, whereas outlet 4 leads into section 11. The processing unit 17 of FIGURE 3, which can be charged with nearly twice as many tobacco bales, has two partition-walls with gratings 18 and 19, which lean towards each other, so that the two sections 20, 21 are formed. The outlets which are provided in one wall of the case are numbered 22 and 23.

The tapping unit 2 of FIGURES 1 and 4 is constructed as air-change-over chamber. Two partition-walls 24, 25 divide the chamber into three channels 26, 27, 28 through which the air passes. These partition-walls border on the vertical outer wall of the one side of the tapping unit, but end at a distance from the vertical outer wall of the other side. This distance equals the distance between the partition-walls 24, 25. The open ends of the partition-wall 25 are provided with movable traps 29 and 30, which can be moved from the outside. With these traps either one of the end openings of the central channel 27 may be alternately closed, while at the same time the other trap separates the outer channels. The top channel 26 contains the ventilator 31 and the air-moistening appliance 32, whereas the outlet 6 is provided in the central channel 27, and the outlet 7 in the lower channel 28. If the traps are in that position which is indicated in the drawings by full lines, the moist air passes through the outlets 6 and 3, or 22 and the casing 3' or 22' (FIGURES 1, 2 and 3) through the openings 3" or 22" into the processing unit 1 or 17 and follows the direction of the arrows shown on full lines through the chamber and back to the tapping unit through the outlets 4 and 7, or 23 (FIGURES 2 to 4). If the traps are turned into that position which is indicated by dotted lines in FIGURE 4, then the air will pass in the opposite direction through the processing unit for moistening the bales, following the direction of the arrows shown on the dotted lines in FIGURE 4. Furthermore, the tapping unit is provided with a box accommodating those instruments which are necessary for operating the apparatus but are not shown in the drawings, such as a hygrostat for regulating the desired humidity in the processing unit in front of the tobacco bales, a hygrometer for measuring the humidity in front of and behind the tobacco bales, a clock for setting the time, and a signal-lamp for terminating and controlling the moistening process, respectively.

FIGURE 5 shows a modification comprising a box-like processing unit 34 in which the tobacco bales 35 may be moistened by means of vapor in a vacuum. This processing unit, which is constructed as a tight case, rests on an under-carriage 36 and may be tilted. In tilting the case the discharge of the tobacco bales is simplified, that is to say that the bales on account of their own weight glide on a conveyor-belt. Of course, the processing unit 34 as well as that of FIGURES 1 to 3 may also be moved on a separate under-carriage, e.g. a truck. Unit 34 has gratings 37 onto which the bales are put, which in turn are admitted through the removable wall 38. This wall also has the outlet 39 which is joined to outlet 42 of the tapping unit 41 by means of a vacuum pipe 40. Furthermore, the tapping unit is connected by pipes 43 and 44 to a vapor-feeder 46 and a vacuum-pump 45, respectively. After the processing unit has been connected with the tapping unit, the processing unit is evacuated and then the vapor is admitted. The tapping unit also comprises a vacuum meter 47, a hygrometer 48 and also a valve 49 for pressure compensation after moistening. Suitably a set of tapping units 41 may be joined to a vacuum-line 45' and the vapor-feeder 46 (FIGURE 6).

I claim:

1. An apparatus for moistening tobacco bales by means of a current of moist air, comprising
at least one stationary tapping unit having means for feeding and exhausting said moist air, and
a movable processing unit constructed as a moisture tight case housing said tobacco bales and releasably connected to said tapping unit means for moistening said tobacco bales by said moist air.

2. The apparatus, as set forth in claim 1, wherein
said tight case of said processing unit has a partition wall with a grating on which said tobacco bales are put,
said partition wall dividing said case into two sections, and each of said sections is provided with outlets for being connected with the tapping unit for feeding and exhausting said moist air.

3. The apparatus, as set forth in claim 2, which includes
a frame surrounding said grating, and crossbeams of said frame are provided with movable bands for covering the spaces between said tobacco bales resting on said grating.

4. The apparatus, as set forth in claim 1, wherein
said case of said processing unit has two partition walls with gratings leaning towards each other,
said partition walls dividing said case into two sections, each of said sections is provided with outlets for being connected with the tapping unit for feeding and exhausting said moist air.

5. The apparatus, as set forth in claim 4, which includes two frames,
each of said frames surrounds one of said gratings of said two partition walls,
cross beams of said gratings being provided with movable bands for covering the spaces between said tobacco bales resting on said gratings.

6. The apparatus, as set forth in claim 1, wherein
said tapping unit is designed as an air-change-over chamber and divided into three parallel channels passed through by the moist air,
one of the outer of said channels is provided with a ventilator and an air-moistening appliance, whereas the central channel and the other outer channel of said channels each having an outlet adapted to be connected to said processing unit.
said central channel being adapted to be joined said outer channel, the latter is equipped with said ventilator and air-moistening appliance, and traps on either end of said central channel for feeding or exhausting the moist air and alternately through said outlets and thus reversing the current of moist air.

7. The apparatus, as set forth in claim 6, wherein said two channels, through which the air passes into and is exhausted from said processing unit, are provided with several outlets.

8. The apparatus, as set forth in claim 1, wherein several tapping units are joined together, and only one of said tapping units is connected with said processing unit, whereas the outlets of the other tapping units are closed.

9. The apparatus, as set forth in claim 1, wherein outlets of said tapping unit and said processing unit face each other and are to be connected by snap plugs.

10. The apparatus, as set forth in claim 1, wherein the moist air is applied by a vacuum means to said processing unit.

11. The apparatus, as set forth in claim 10, wherein said case of said processing unit is provided with a junction for vacuum and for vapor, to be connected with said tapping unit, and several sockets are provided on said tapping unit, adapted to be connected with a vacuum pump and a vapor feed, respectively, said tapping unit being equipped with a vacuum meter, a hygrometer, as well as a valve for pressure compensation.

12. The apparatus, as set forth in claim 11, wherein said case is tiltable.

References Cited

UNITED STATES PATENTS

| | | | |
|---|---|---|---|
| 132,935 | 11/1872 | Suggett | 131—134 |
| 1,919,107 | 7/1933 | Harris | 131—138 |
| 2,505,973 | 5/1950 | Julian | 99—259 |
| 2,591,026 | 4/1952 | Touton | 131—136 |
| 2,869,556 | 1/1959 | Rowell | 131—135 |
| 2,900,986 | 8/1959 | Pietruska | 131—134 |
| 2,980,117 | 4/1961 | De Saedeleer | 131—134 |
| 3,124,142 | 3/1964 | Philbrick et al. | 131—135 |

FOREIGN PATENTS

| | | |
|---|---|---|
| 1,009,085 | 5/1957 | Germany. |
| 1,022,142 | 1/1958 | Germany. |
| 895,726 | 5/1962 | Great Britain. |
| 950,184 | 2/1964 | Great Britain. |

ALDRICH F. MEDBERY, *Primary Examiner.*